(12) United States Patent
Hishinuma et al.

(10) Patent No.: US 6,790,474 B1
(45) Date of Patent: Sep. 14, 2004

(54) FUEL ELECTRODE OF SOLID OXIDE FUEL CELL AND PROCESS FOR THE PRODUCTION OF THE SAME

(75) Inventors: Masakazu Hishinuma, Kanagawa (JP); Yoshio Matsuzaki, Tokyo (JP)

(73) Assignee: Tokyo Gas Co., Ltd., Tokyo (JP)

( * ) Notice: Subject to any disclaimer, the term of this patent is extended or adjusted under 35 U.S.C. 154(b) by 0 days.

(21) Appl. No.: 09/319,688
(22) PCT Filed: Jul. 30, 1997
(86) PCT No.: PCT/JP97/02656
   § 371 (c)(1),
   (2), (4) Date: Jun. 9, 1999
(87) PCT Pub. No.: WO98/28808
   PCT Pub. Date: Jul. 2, 1998

(30) Foreign Application Priority Data

Dec. 20, 1996 (JP) ................................. 340870

(51) Int. Cl.$^7$ ............................................... B05D 5/12
(52) U.S. Cl. .................................... 427/115; 427/126.3
(58) Field of Search ........................... 429/40, 27, 105, 429/223; 427/115, 126.3

(56) References Cited

U.S. PATENT DOCUMENTS

| | | | |
|---|---|---|---|
| 4,702,971 A | * 10/1987 | Isenberg | 429/31 |
| 4,791,079 A | * 12/1988 | Hazbun | 502/4 |
| 5,021,304 A | * 6/1991 | Ruka et al. | 429/30 |
| 5,227,258 A | * 7/1993 | Ito et al. | 429/40 |
| 5,474,800 A | * 12/1995 | Matsuzaki | 427/115 |
| 6,099,985 A | * 8/2000 | Elangovan et al. | 429/44 |

FOREIGN PATENT DOCUMENTS

| | | | |
|---|---|---|---|
| JP | 121694 A | * | 4/1992 |
| JP | 4-121964 | | 4/1992 |
| JP | 169067 A | * | 6/1992 |
| JP | 5-174836 | | 7/1993 |
| JP | 5-266892 | | 10/1993 |
| JP | 7-326364 | | 12/1995 |
| JP | 8-162120 | | 6/1996 |

* cited by examiner

Primary Examiner—Brian K. Talbot
(74) Attorney, Agent, or Firm—Towsend and Towsend and Crew LLP

(57) ABSTRACT

There is disclosed a fuel electrode of solid oxide fuel cells which is made of a cermet composed of yttria-stabilized zirconia containing a transition metal dissolved therein and nickel (Ni) or a cermet composed of yttria-stabilized zirconia containing a transition metal dissolved therein, nickel (Ni) and cerium oxide containing a divalent or trivalent metal dissolved therein, and which can be obtained by adding a solution of a metallo-organic compound of yttrium (Y) and a solution of a metallo-organic transition-metal compound to a solution of a metallo-organic compound of zirconium (Zr) to prepare a mixed solution of metallo-organic compounds of Zr—Y-transition metal; adding NiO powder or a powder mixture of NiO powder with cerium oxide powder containing a divalent or trivalent metal oxide dissolved therein to the mixed solution of the metallo-organic compounds to prepare a slurry; and subjecting the slurry to hydrolysis, polycondensation, pyrolysis, annealing and reduction successively. The fuel electrode is formed on a solid electrolyte layer by a screen printing process.

16 Claims, 7 Drawing Sheets

Prior Art

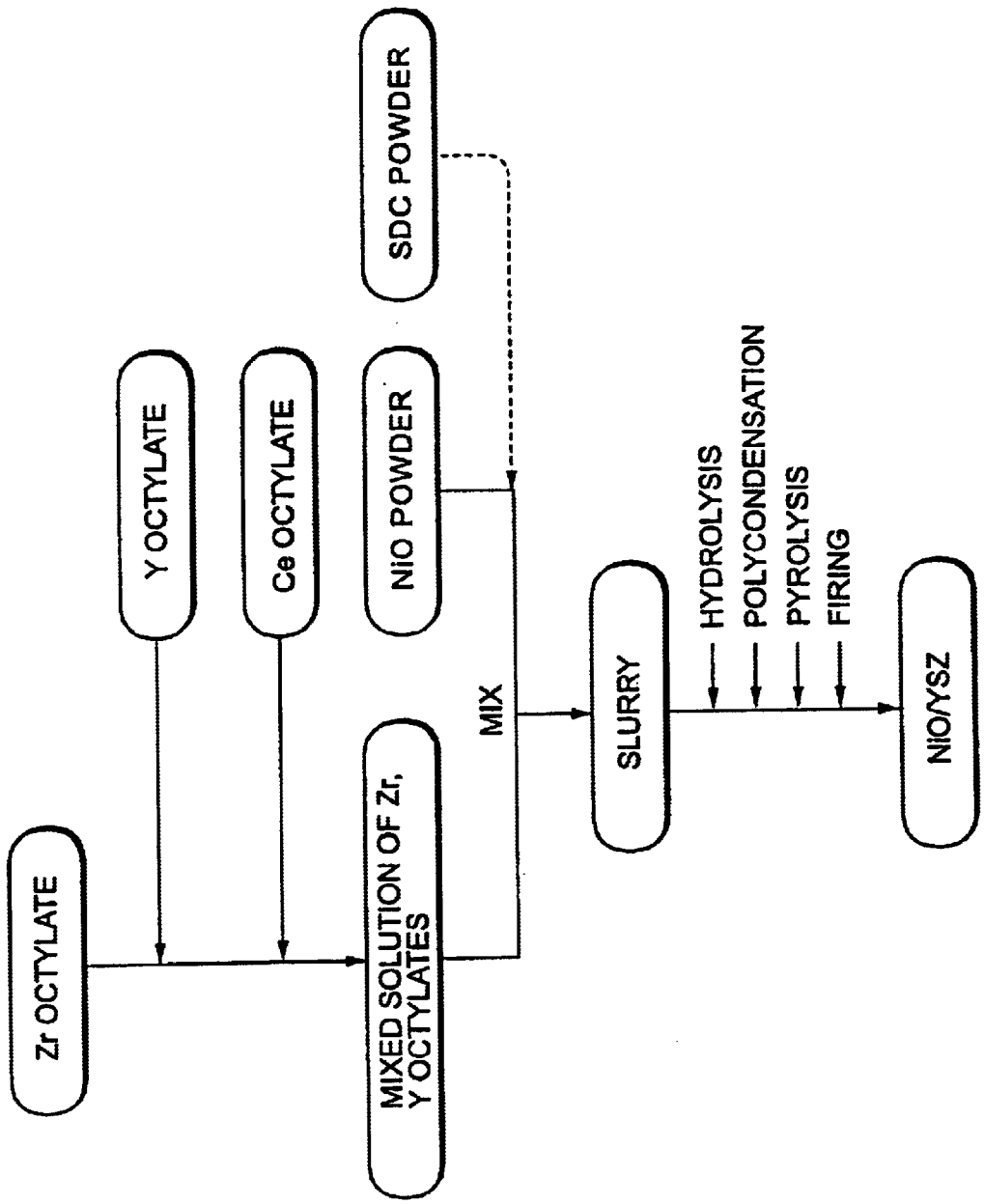

FIG. 6

RESULTS OF EXAMPLES

| EXAMPLE | Ni CONCENTRATION IN CERMET (wt%) | YSZ OR CeYSZ CONCENTRATION IN CERMET (wt%) | AMOUNT OF Ce DISSOLVED INTO YSZ IN CERMET (mol%) | SDC CONCENTRATION IN FUEL ELECTRODE (wt%) | FUEL | OPERATION TEMPERATURE (°C) | DETERIORATION RATIO IN FIRST 1000 HOURS (%/1000hr) | VOLTAGE AFTER 1000 HOURS (V) |
|---|---|---|---|---|---|---|---|---|
| 1 | 90 | 10 | 10 | 0 | HYDROGEN | 1000 | 1.3 | 0.817 |
| 2 | 90 | 10 | 10 | 0 | HYDROGEN | 900 | 1.2 | 0.768 |
| 3 | 90 | 10 | 10 | 0 | HYDROGEN + STEAM | 1000 | 1.4 | 0.771 |
| 4 | 81 | 10 | 10 | 9 | HYDROGEN | 1000 | 0.98 | 0.805 |
| 5 | 81 | 10 | 10 | 9 | HYDROGEN | 900 | 0.94 | 0.785 |
| 6 | 81 | 10 | 10 | 9 | HYDROGEN + STEAM | 1000 | 0.99 | 0.773 |
| 7 | 60 | 10 | 10 | 30 | HYDROGEN | 1000 | 0.88 | 0.755 |
| 8 | 60 | 10 | 10 | 30 | HYDROGEN | 900 | 0.83 | 0.725 |
| 9 | 60 | 10 | 10 | 30 | HYDROGEN + STEAM | 1000 | 0.89 | 0.713 |
| COMPARATIVE EXAMPLE | | | | | | | | |
| 1 | 90 | 10 | 0 | 0 | HYDROGEN | 1000 | 3.4 | 0.724 |
| 2 | 90 | 10 | 0 | 0 | HYDROGEN | 900 | 3.2 | 0.657 |
| 3 | 90 | 10 | 0 | 0 | HYDROGEN + STEAM | 1000 | 3.3 | 0.667 |
| 4 | 81 | 19 | 0 | 0 | HYDROGEN | 1000 | 2.9 | 0.713 |
| 5 | 81 | 19 | 0 | 0 | HYDROGEN | 900 | 2.7 | 0.645 |
| 6 | 81 | 19 | 0 | 0 | HYDROGEN + STEAM | 1000 | 2.8 | 0.656 |
| 7 | 60 | 40 | 0 | 0 | HYDROGEN | 1000 | 2.3 | 0.701 |
| 8 | 60 | 40 | 0 | 0 | HYDROGEN | 900 | 2.2 | 0.633 |
| 9 | 60 | 40 | 0 | 0 | HYDROGEN + STEAM | 1000 | 2.2 | 0.645 |

FUEL ELECTRODE OF SOLID OXIDE FUEL CELL AND PROCESS FOR THE PRODUCTION OF THE SAME

BACKGROUND OF THE INVENTION

1. Field of the Invention

The present invention relates to a fuel electrode of a solid oxide fuel cell and a process for producing the same.

2. Description of the Prior Art

Fuel cells have recently been noted as energy sources from the viewpoint of not only saving of resources but also influence on the environment. In a solid oxide fuel cell (SOFC), a fuel electrode is disposed on one surface of a solid electrolyte layer, while an air electrode is disposed on an opposite surface. The cell is constituted of a plurality of cells electrically connected to one another, with separators each laminated between the adjacent cells for distributing fuel and oxidizing gas to the cell, and has a higher operation temperature of 700 to 1000° C. than other fuel cells to provide a higher power generating efficiency. Since all constituting materials are solid, they can easily be handled. These advantages advance practical use.

A circuit structure of a conventional typical solid oxide fuel cell is diagrammatically shown in FIG. 1 together with a sectional view of a cell. In FIG. 1, a fuel electrode 2 is formed on one surface of a central solid electrolyte layer 1 (upper surface of the solid electrolyte layer 1 in FIG. 1), an air electrode 3 is formed on an opposite surface, and the electrodes have interfaces 4 and 5 with the solid electrolyte layer 1, respectively. In the solid electrolyte layer 1, mainly 8YSZ (YSZ denotes a yttria-stabilized zirconia) or 3YSZ is used. The fuel electrode 2 and air electrode 3 are connected by an external circuit via a load 6. When fuel gases such as hydrogen ($H_2$), methane ($CH_4$) and the like are supplied to the fuel electrode 2, and oxidizing agents such as air, oxygen ($O_2$) and the like are supplied to the air electrode 3, an electromotive force is generated between the electrodes, so that current flows to the load 6 connected to the external circuit. It is known that in this type of solid oxide fuel cell, electrode material composition and structure have a large influence on cell performance, and especially the influence of the fuel electrode 2 is large. In the fuel electrode 2, a cermet of metal and oxide is generally used.

As the fuel electrode 2, a mixture of Ni and YSZ particles, i.e., Ni—YSZ cermet, is known.

Since the electrode reaction of the solid oxide fuel cell is accompanied with a gas phase reaction, as shown in FIG. 2, the conventional electrode reaction field of the fuel electrode 2 is limited to the vicinity of three-phase lines in which the electrolyte, Ni particles in the cermet and gas phase coexist, the current is drawn to the vicinity of the three-phase lines, and current density locally increases. Moreover, in the conventional fuel electrode 2, Ni particles are not uniformly dispersed in the cermet, and electrolyte films or other fine particles are not present in a small amount on surfaces of the Ni particles. Therefore, it is difficult to inhibit the Ni particles from being flocculated.

As a result, a solid oxide fuel cell having the conventional fuel electrode has the disadvantages that (1) since the electrode reaction of the fuel electrode is limited to the vicinity of the three-phase lines with the Ni particles in the cermet and the gas phase coexisting therein, the overvoltage is large, and (2) the flocculation of the Ni particles directly causes the deterioration of the fuel cell.

SUMMARY OF THE INVENTION

The present invention has been developed to solve the above-mentioned problems in the conventional fuel electrode, and an object thereof is to provide a fuel electrode of a solid oxide fuel cell and a producing process thereof, in which, by providing metal oxide particles in a cermet with electronic conductivity, the field of electrode reaction is largely enlarged, flocculation of Ni particles is minimized, and power generating performance of the cell can be enhanced.

To attain the above-mentioned object, according to a first basic aspect of the present invention, there is provided a process for producing a fuel electrode of a solid oxide fuel cell, each cell comprising a solid electrolyte layer, a fuel electrode disposed on one surface of the solid electrolyte layer, and an air electrode disposed on an opposite surface, by alternately laminating a plurality of cells, adjacent cells being electrically connected to each other, and a plurality of separators for distributing fuel gas to the fuel electrode of each cell and oxidizing gas to the air electrode, comprising the steps of: adding a solution of a metallo-organic compound of yttrium (Y) and a solution of a metallo-organic transition-metal compound to a solution of a metallo-organic compound of zirconium (Zr) to prepare a mixed solution of metallo-organic compounds of Zr—Y-transition metal; mixing NiO powder into the mixed solution of the metallo-organic compounds to prepare a slurry; and successively subjecting the slurry to hydrolysis, polycondensation, pyrolysis, annealing and reduction to obtain a cermet formed of yttria-stabilized zirconia (YSZ, i.e., $CeO_2$—$Y_2O_3$—$ZrO_2$) containing the transition metal dissolved therein, and having electronic conductivity in a fuel electrode operating atmosphere, and Ni.

According to a second basic aspect of the present invention, there is provided a process for producing a fuel electrode of a solid oxide fuel cell, each cell comprising a solid electrolyte layer, a fuel electrode disposed on one surface of the solid electrolyte layer, and an air electrode disposed on an opposite surface, by alternately laminating a plurality of cells, adjacent cells being electrically connected to each other, and a plurality of separators for distributing fuel gas to the fuel electrode of each cell and oxidizing gas to the air electrode, comprising the steps of: adding a solution of a metallo-organic compound of yttrium (Y) and a solution of a metallo-organic transition-metal compound to a solution of a metallo-organic compound of zirconium (Zr) to prepare a mixed solution of metallo-organic compounds of Zr—Y-transition metal; mixing NiO powder and cerium oxide powder containing a divalent or trivalent metal oxide dissolved therein to the mixed solution of the metallo-organic compounds to prepare a slurry; and successively subjecting the slurry to hydrolysis, polycondensation, pyrolysis, annealing and reduction to obtain a cermet formed of yttria-stabilized zirconia (YSZ) containing the transition metal dissolved therein, nickel (Ni) and cerium oxide containing the divalent or trivalent-metal dissolved therein.

The transition metal described in the first and second basic aspects is one selected from the group consisting of cerium (Ce), titanium (Ti) and praseodymium (Pr).

The metallo-organic compound described in the first and second basic aspects is one selected from the group consisting of metallic octylate, metallic naphthenate, metallic stearate and another metallic aliphatic acid salt, and metallic acetyl acetonate complex.

The fuel electrode described in the first and second basic aspects is formed on a solid electrolyte by a screen printing process.

The concentration of the transition metal in the yttria-stabilized zirconia (YSZ) containing the transition metal dissolved therein according to the first and second basic aspects is in the range of 1 mol % to 30 mol %.

The volume fraction of the cerium oxide containing the divalent or trivalent metal dissolved therein according to the second basic aspect is in the range of 1% to 70%.

The concentration of Ni in the fuel electrode according to the first and second basic aspects is in the range of 20% to 95% as a volume fraction.

The concentration of the yttria-stabilized zirconia containing the transition metal dissolved therein in the cermet according to the first and second basic aspects is in the range of 1% to 50% as the volume fraction.

The divalent or trivalent metal oxide according to the second basic aspect is one, or a combination of plural ones, of BeO, MgO, CaO, SrO, BaO, $Sm_2O_3$, $Y_2O_3$, $La_2O_3$, $Gd_2O_3$, $Sc_2O_3$, $Pr_2O_3$, $Nd_2O_3$, $Eu_2O_3$, $Yb_2O_3$, $Dy_2O_3$, and $Ho_2O_3$.

The cermet according to the second basic aspect has a structure in which surfaces of Ni particles and surfaces of cerium oxide particles containing divalent or trivalent metals dissolved therein are covered with YSZ containing the transition metal dissolved therein in the form of thin films or fine particles.

The hydrolysis of the first or second basic aspect is performed using moisture in air.

As materials of the cermet according to the second basic aspect, cerium oxide powder containing the divalent or trivalent metal dissolved therein, Ni powder and metallic octylate solution of Ce, Y and Zr are used, and YSZ fine particles containing a fine transition metal dissolved therein are uniformly dispersed between the cerium oxide particles containing the divalent or trivalent metal dissolved therein and the Ni particles. In this case, the average particle diameter of the Ni particles in the cermet is 1 μm or more, the average particle diameter of the cerium oxide particles containing the divalent or trivalent metal dissolved therein is 1 μm or more, and the average particle diameter of the YSZ particles containing the transition metal dissolved therein is 1 μm or less.

According to a third basic aspect of the present invention, there is provided a fuel electrode of a solid oxide fuel cell comprising a cermet composed of yttria-stabilized zirconia (YSZ), containing a transition metal dissolved therein and having electronic conductivity in a fuel electrode operating atmosphere, and nickel (Ni).

The cermet mentioned in the third basic aspect has a structure in which Ni particles and YSZ particles containing the transition metal dissolved therein are uniformly dispersed.

According to a fourth basic aspect of the present invention, there is provided a fuel electrode of a solid oxide fuel cell comprising a cermet composed of yttria-stabilized zirconia (YSZ) containing a transition metal dissolved therein and having electronic conductivity in a fuel electrode operating atmosphere, nickel (Ni), and cerium oxide containing a divalent or trivalent metal dissolved therein.

According to the fourth basic aspect, the cermet has a structure in which surfaces of Ni particles and surfaces of cerium oxide particles containing the divalent or trivalent metal dissolved therein, uniformly dispersed in the cermet, are covered with YSZ thin films or fine particles containing the transition metal dissolved therein.

According to the fourth basic aspect, as materials of the cermet, cerium oxide powder containing a divalent or trivalent metal dissolved therein, Ni powder and a metallic octylate solution of Ce, Y and Zr are used, and YSZ fine particles containing the transition metal dissolved therein are uniformly dispersed between the cerium oxide particles containing the divalent or trivalent metal dissolved therein and the Ni particles. In the cermet, the average particle diameter of the Ni particles is 1 μm or more, the average particle diameter of the cerium oxide particles containing the divalent or trivalent metal dissolved therein is 1 μm or more, and the average particle diameter of the YSZ particles containing the transition metal dissolved therein is 1 μm or less.

As clearly seen from the above-mentioned aspects, the present invention is mainly characterized in that:

(a) the transition metal for use in the fuel electrode is cerium (Ce), titanium (Ti) or praseodymium (Pr) which easily provides YSZ of the fuel electrode with the electronic conductivity;

(b) the metallo-organic compound for use in the fuel electrode is a metallic octylate, metallic naphthenate, metallic stearate or another metallic aliphatic acid salt, or metallic acetyl acetonate complex which is relatively stable as compared with other metallo-organic compounds; and (c) the fuel electrode is formed on the solid electrolyte layer by a screen printing process.

In the present invention, pyrolysis of the metallo-organic compound as an oxide film forming process is applied. For example, since the pyrolysis as the film forming process is applied in synthesizing CeYSZ, a fuel electrode can be obtained with a structure in which CeYSZ films or fine particles are uniformly deposited on surfaces of Ni particles and particles of cerium oxide containing the divalent or trivalent metal dissolved therein or another metal oxide. Therefore, metal and metal oxide particles are uniformly dispersed without being flocculated.

The present invention having the above-mentioned aspects provides the following effects:

(1) Since cerium oxide ($CeO_2$) is applied to the fuel electrode formed of the cermet of Ni and YSZ, as materials of a YSZ—$CeO_2$ solid-solution (CeYSZ), metallo-organic compounds are used to perform hydrolysis and polycondensation reactions in the slurry with Ni, so that $CeO_2$ is dissolved in YSZ, and electronic conductivity is developed in CeYSZ. The electrode reaction is not limited to the vicinity of the three-phase lines of the solid electrolyte layer, Ni particles and gas phase, but also occurs in a three-phase interface of the solid electrolyte layer, YSZ with $CeO_2$ doped therein (CeYSZ) and gas phase. Therefore, the field of electrode reaction is remarkably expanded. Moreover, when the electrode is produced in the above-mentioned process, fine particles of YSZ with $CeO_2$ doped therein are uniformly dispersed around the Ni particles, so that the field of electrode reaction is further expanded.

(2) Reduction of Contact Resistance between the Electrode and Solid Electrolyte Layer According to the present invention, a fuel electrode can be obtained with a structure in which the films or the fine particles of the electrolyte provided with electronic conductivity are uniformly deposited on the surfaces of Ni or NiO particles or a surface of the solid electrolyte layer as a center, so that the Ni or NiO particles are uniformly dispersed without being flocculated. Moreover, since the pyrolysis of the film forming process is applied in synthesizing CeYSZ, the solid electrolyte layer as the center near the interface and the electrolyte provided with electronic conductivity in the fuel electrode are bound with each other very strongly, and integrally constructed. Therefore, the electrolyte provided with electronic conductivity of the fuel electrode grows from the surface of the central solid electrolyte layer, and the field of the electrode reaction is enlarged. Consequently, there is provided an electrode small in contact resistance.

(3) Reduction of Polarization

As described in (2) above, since the Ni or NiO particles are uniformly dispersed in the cermet, and the electrolyte particles in the cermet provided with the electronic conductivity bind strongly with the solid electrolyte layer in the interface, the electrode reaction is increased in the structure. Specifically, since an ideal electrode structure in which the electrode reaction easily occurs is obtained, polarization by the fuel electrode is remarkably minimized.

(4) Enhancement of Binding Strength of Central Solid Electrolyte Layer and Electrode As described in (2) above, since the central solid electrolyte layer strongly binds with the electrolyte layer of the fuel electrode, the binding strength of the electrode and solid electrolyte layer is very strong, and the Ni particles are uniformly dispersed. The periphery of the Ni particles is covered with the electrolyte film or other fine particles, the Ni particles are prevented from being flocculated, and the electrode is prevented from being easily peeled. As a result, a long-life electrode is obtained.

Moreover, according to the present invention, the solution of the metallo-organic compound of yttrium (Y) and the solution of the metallo-organic transition-metal (M) compound are added to the solution of the metallo-organic compound of zirconium (Zr) to prepare the mixed solution of Zr, Y and M. Furthermore, Nio powder is mixed with the cerium oxide powder (e.g., SDC powder) containing the divalent or trivalent metal oxide, e.g., one or a combination of two or more of oxides of yttrium (Y) and lanthanoids (La, Nd, Sm, Gd, Dy, Ho, Yb and the like) dissolved therein to prepare the slurry. In the slurry, hydrolysis, polycondensation, pyrolysis, annealing and reduction of the Zr, Y, M mixed salt are successively performed to obtain a cermet formed of the yttria-stabilized zirconia (YSZ) particles containing the transition metal (M) dissolved therein, nickel (Ni) particles, and cerium oxide particles containing one, or a combination of two or more, of oxides of yttrium (Y) and lanthanoids (La, Nd, Sm, Gd, Dy, Ho, Yb and the like) dissolved therein. Therefore, remarkably superior effects are provided as follows:

The field of the electrode reaction can further be enlarged;

Since the electrode having excellent electrode performance can be obtained at either high or low operation temperature, the solid oxide fuel cell whose performance is not impaired by the temperature distribution in the cell can be produced; and Since the $CeO_2$ particles containing the divalent or trivalent metal oxide dissolved therein and CeYSZ fine particles inhibit the Ni particles from being flocculated with one another, a fuel electrode difficult to be deteriorated and high in durability can be obtained.

These and other objects, features and advantages of the present invention will be appreciated by a person skilled in the art in the following description of preferred embodiments conforming to the principle of the present invention in conjunction with the attached drawings.

BRIEF DESCRIPTION OF THE DRAWINGS

FIG. 5 is an explanatory view of a process for producing the fuel electrode according to the present invention;

FIG. 6 is a table showing production and evaluation conditions in examples of the present invention and comparative examples;

DETAILED DESCRIPTION OF SPECIFIC EXEMPLARY EMBODIMENTS

Several preferred embodiments will be described below with reference to the attached drawings.

First, FIG. 5 is an explanatory view of a process for producing the fuel electrode according to a first embodiment of the present invention.

According to the first embodiment of the present invention, an octylate of zirconium (Zr) as a kind of metallo-organic compound is prepared, an octylate of yttrium (Y) and an octylate of cerium (Ce) are further added to prepare a mixed solution of Zr—Y—Ce salt, and NiO powder is further mixed to prepare a slurry. The slurry is successively subjected to hydrolysis, polycondensation, pyrolysis, calcining (annealing) and reduction to obtain a mixed material (cermet) of NiO and $CeO_2$—$Y_2O_3$—$ZrO_2$ (CeYSZ).

Furthermore, as a second embodiment of the present invention, in addition to the above-mentioned materials, $CeO_2$ powder containing a divalent or trivalent metal oxide, e.g., samaria ($Sm_2O_3$), dissolved (doped) therein may be mixed. Additionally, the powder with samaria dissolved therein is termed an SDC powder. The second embodiment will be described later with reference to FIG. 4.

Moreover, in the present invention, a solid electrolyte forming a solid electrolyte plate as a center of a cell constituting a fuel cell can be provided with oxygen ion conductivity for use by dissolving some percentages to dozens of percentages of yttrium oxide ($Y_2O_3$), calcium oxide (CaO) or another divalent or trivalent metal oxide in zirconium oxide ($ZrO_2$) or another tetravalent metal oxide.

As the metallo-organic compound, a relatively stable naphthenate, octylate or another aliphatic acid salt, or acetyl acetonate complex can be used. As the organic solvent, toluene, acetyl acetone or another solvent capable of uniformly dissolving the used metallic compound, or a mixed solvent thereof, is used. Additionally, as the transition metal, instead of cerium, praseodymium (Pr) or titanium (Ti) may be used.

Additionally, the cermet is produced as described above in such a manner that the volume ratio of Ni relative to the entire cermet is in the range of 0.4 to 0.98.

As described above, in the first embodiment of the present invention, $CeO_2$ is dissolved in YSZ in the fuel electrode composed of the cermet of Ni and YSZ. The metallo-organic compound is used in the material of YSZ—$CeO_2$ to perform hydrolysis and polycondensation in the slurry with Ni. $CeO_2$ is dissolved in YSZ to provide YSZ with electronic conductivity.

Figure 1:
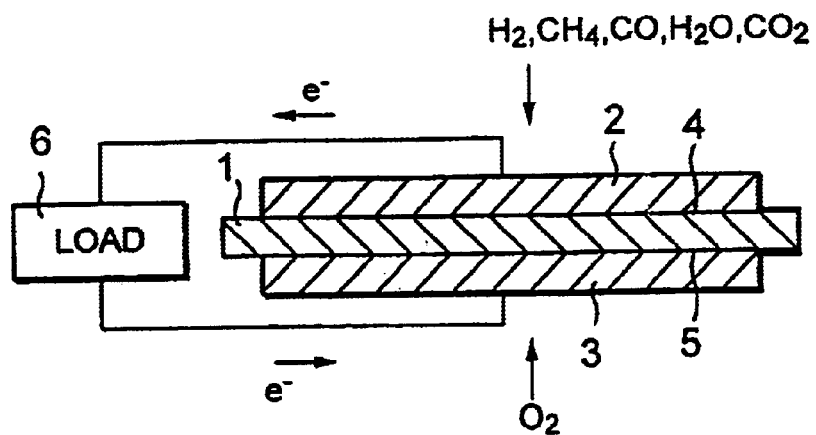
FIG. 1 is a schematic view showing a circuit structure of a conventional typical solid oxide fuel cell together with a sectional view of a cell.
Figure 2:
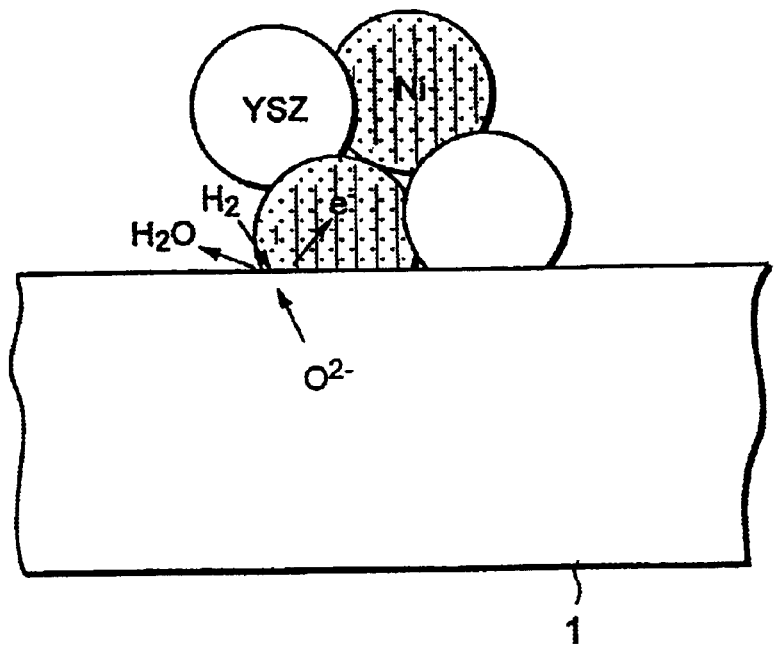
FIG. 2 is a schematic explanatory view of a structure of a conventional fuel electrode and an electrode reaction thereof.
Figure 3:
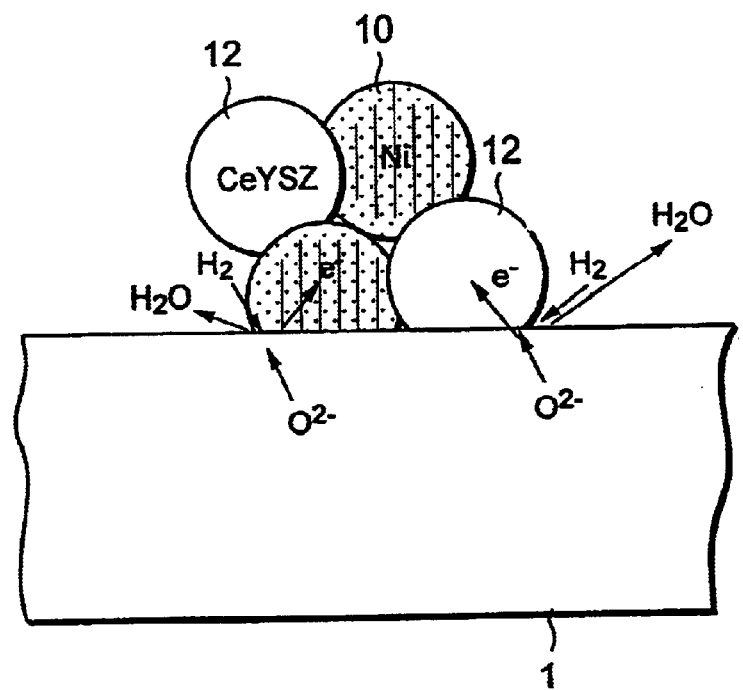
FIG. 3 is a schematic explanatory view of a structure of a fuel electrode according to an embodiment of the present invention and an electrode reaction thereof.

FIG. 3 is a schematic explanatory view showing a structure of the fuel electrode as the first embodiment of the present invention, and an electrode reaction thereof. Additionally, in FIG. 3, CeYSZ particles 12 are actually fine particles, but are enlarged to facilitate understanding.

In the first embodiment, since $CeO_2$ is dissolved in YSZ, electronic conductivity is developed in the CeYSZ particles 12. Therefore, the electrode reaction is not limited to the vicinity of three-phase lines of the solid electrolyte layer 1, Ni particles 10 and gas phase but, as shown in FIG. 3, also occurs in a three-phase interface of the solid electrolyte layer 1, YSZ (CeYSZ) particles 12 containing $CeO_2$ dissolved therein and gas phase, so that the field of electrode reaction is largely expanded as compared with the conventional fuel electrode. Furthermore, by using the metallo-organic compound as the material to produce the electrode in the process of FIG. 3, the CeYSZ fine particles 12 containing $CeO_2$ dissolved therein are dispersed in the fuel electrode, and the field of electrode reaction is therefore expanded further.

In the present invention, the concentration of the transition metal in the yttria-stabilized zirconia (YSZ) containing the transition metal dissolved therein is in the range of 1 mol % to 30 mol %. At a concentration of the transition metal of less than 1 mol %, the contribution to enhancement of the electronic conductivity in YSZ is in the range of small to provide no effects, while at the concentration of 30 mol % or more, the ion conductivity in YSZ is inhibited, thereby lowering the electrode performance.

Moreover, in the present invention, for the volume fraction of the yttria-stabilized zirconia containing the transition metal dissolved therein in the fuel electrode, at 1% or less no effects are provided, while at 50% or more the conductivity of the cermet is lowered. Therefore, it is in the range of 1% to 50%.

Furthermore, the Ni concentration in the fuel electrode is in the range of 20% to 95% as a volume fraction. At 20% or less, there is no passing of Ni in the fuel electrode, and the resistance of the fuel electrode itself is increased. At 95% or more, much Ni is flocculated, and the fuel electrode is easily deteriorated.

Additionally, in the present invention, hydrolysis is performed using moisture in air. Water may positively be added, but by using the moisture in air to gradually perform the hydrolysis, the polymerization degree of the next-step polycondensation reaction is easily controlled.

A second embodiment of the present invention will next be described with reference to FIG. 4.

Figure 4:
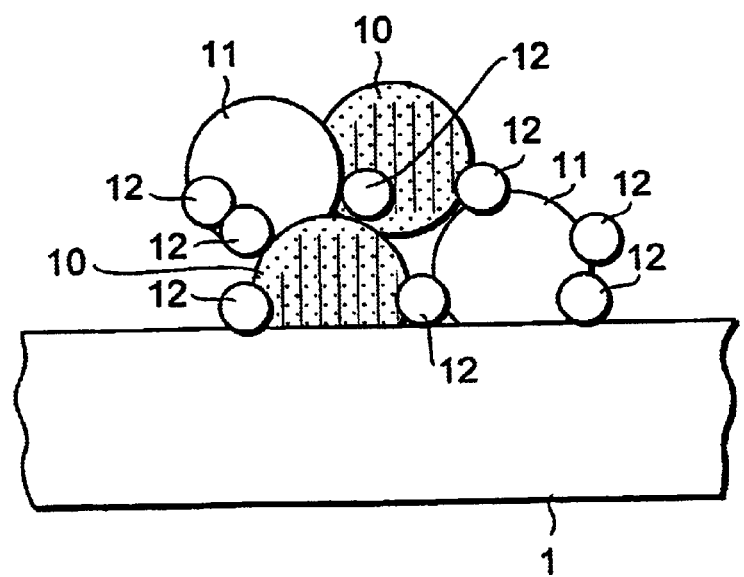
FIG. 4 is a schematic explanatory view of a structure of a fuel electrode according to another embodiment of the present invention.

FIG. 4 is a schematic explanatory view of a structure of a fuel electrode according to the second embodiment of the present invention. As clarified from FIG. 4, according to the second embodiment, $CeO_2$ particles (SDC particles) 11 containing, for example, samaria ($Sm_2O_3$) dissolved therein and Ni particles 10 are uniformly dispersed on one surface of the solid electrolyte layer 1, and the fuel electrode is formed of the cermet with YSZ (CeYSZ) fine particles 12 containing $CeO_2$ particles dissolved therein or electrolyte films uniformly deposited among the particles. Therefore, there is provided a structure in which the SDC particles 11 and CeYSZ fine particles 12 inhibit the Ni particles 10 from being flocculated with one another.

The process for producing the fuel electrode shown in FIG. 4 is as follows:

A solution of a metallo-organic compound of yttrium (Y) and a solution of a metallo-organic transition-metal (tentatively referred to as M) compound are added to a solution of a metallo-organic compound of zirconium (Zr) to prepare a mixed solution of Zr, Y and M. NiO powder and cerium oxide powder containing a divalent or trivalent metal oxide dissolved therein are further mixed to prepare a slurry. In the slurry, hydrolysis, polycondensation, pyrolysis, annealing and reduction of the mixed salt of Zr, Y, M are performed successively to obtain a cermet composed of yttria-stabilized zirconia (YSZ) particles containing the transition metal dissolved therein, nickel (Ni) particles and cerium oxide particles containing a divalent or trivalent metal dissolved therein.

Also in the second embodiment, for the same reasons as the first embodiment, the concentration of the transition metal in the yttria-stabilized zirconia (YSZ) containing the transition metal dissolved therein is in the range of 1 mol % to 30 mol %, and the volume fraction of the yttria-stabilized zirconia containing the transition metal dissolved therein in the fuel electrode is in the range of 1% to 50%. Moreover, the second embodiment is the same as the first embodiment in that hydrolysis is performed using the moisture in air, and the Ni concentration in the fuel electrode is in the range of 20% to 95%.

Additionally, in the second embodiment, for the cerium oxide containing the divalent or trivalent metal dissolved therein, at a volume fraction of the particles in the cermet of less than 1% no effect results from the addition of the cerium oxide powder, while at 70% or more the volume fraction of the Ni particles is excessively small to lower the performance as the fuel electrode. Therefore, it is set in the range of 1% to 70%.

Moreover, the divalent or trivalent metal oxide in the second embodiment is one, or a combination of plural ones, of BeO, MgO, CaO, SrO, BaO, $Sm_2O_3$, $Y_2O_3$, $La_2O_3$, $Gd_2O_3$, $Sc_2O_3$, $Pr_2O_3$, $Nd_2O_3$, $Eu_2O_3$, $Yb_2O_3$, $Dy_2O_3$, and $Ho_2O_3$. These metal oxides have a function of enhancing the conductivity of cerium oxide.

Furthermore, the cermet of the present invention has a structure in which surfaces of Ni particles and surfaces of cerium oxide particles containing divalent or trivalent metals dissolved therein are covered with the yttria-stabilized zirconia containing the transition metal dissolved therein in a form of thin films or fine particles. When the surfaces are covered with thin films, the flocculation of Ni particles can be suppressed. When they are covered with fine particles, the flocculation of Ni particles is effectively suppressed, and the electrode reaction field is further effectively enlarged.

Examples of the present invention will next be described together with comparative examples.

First, aspects common to the examples and comparative examples will be described below. As conditions for producing the fuel electrode, NiO powder having an average particle diameter of 0.9 μm, SDC powder having an average particle diameter of 1.5 μm (SDC indicates $CeO_2$ containing $Sm_2O_3$ dissolved therein, and its composition formula is $Ce_{0.8}Sm_{0.2}O_{1.9}$), and a toluene, acetyl acetone solution of cerium (Ce) octylate and zirconium octylate (the solution is adjusted in such a manner that the composition after pyrolysis is $(CeO_2)_{0.1}\{(ZrO_2)_{0.92}(Y_2O_3)_{0.08}\}_{0.9})$) are mixed in such a manner that the weight ratio after the pyrolysis is $NiO:SDC:(CeO_2)_{0.1}\{(ZrO_2)_{0.92}(Y_2O_3)_{0.08}\}_{0.9} = 0.81:0.09:0.1$. After hydrolysis and polycondensation are performed to provide an appropriate viscosity, screen printing is performed on the solid electrolyte plate. Subsequently, the pyrolysis is performed at 400° C., post-calcining (annealing) is performed at 1450° C., and reduction is then performed at 1000° C. in a reducing atmosphere. On the other hand, as evaluation conditions (i.e., trial experimental conditions of a fuel cell), air is used in an oxidizing agent, and an output current of the fuel cell is 0.3 A/cm².

EXAMPLE 1
(1) Other Producing Conditions
 Ni concentration in the cermet: 90 wt %
 YSZ concentration in the cermet: 10 wt %
 Amount of Ce dissolved in YSZ: 10 mol %
 Loading of SDC powder: 0 wt %
(2) Other Evaluation Conditions
 Fuel: hydrogen
 Operation temperature: 1000° C.

EXAMPLE 2
(1) Other Producing Conditions
 the same as Example 1
(2) Other Evaluation Conditions
 Fuel: hydrogen
 Operation temperature: 900° C.

EXAMPLE 3
(1) Other Producing Conditions
 the same as Example 1
(2) Other Evaluation Conditions
 Fuel: hydrogen+$H_2O$ (21.5%)
 Operation temperature: 1000° C.

EXAMPLE 4
(1) Other Producing Conditions
 Ni concentration in the cermet: 81 wt %
 YSZ concentration in the cermet: 10 wt %
 Amount of Ce dissolved in YSZ: 10 mol % (Material of CeYSZ: metallo-organic compound) (particle diameter of 1 μm or less)
 Loading of SDC powder: 9 wt % (Material of SDC: SDC powder (particle diameter of some microns))
(2) Other Evaluation Conditions
 Fuel: hydrogen
 Operation temperature: 1000° C.

EXAMPLE 5
(1) Other Producing Conditions
 the same as Example 4
(2) Other Evaluation Conditions
 Fuel: hydrogen
 Operation temperature: 900° C.

EXAMPLE 6
(1) Other Producing Conditions
 the same as Example 4
(2) Other Evaluation Conditions
 Fuel: hydrogen+$H_2O$ (2(1)5%)
 Operation temperature: 1000° C.

EXAMPLE 7
(1) Other Producing Conditions
 Ni concentration in the cermet: 60 wt %
 YSZ concentration in the cermet: 10 wt %
 Amount of Ce dissolved in YSZ: 10 mol % (Material of CeYSZ: metallo-organic compound) (particle diameter of 1 μm or less)
 Loading of SDC powder: 10 wt % (Material of SDC: SDC powder (particle diameter of some microns))
(2) Other Evaluation Conditions
 Fuel: hydrogen
 Operation temperature: 1000° C.

EXAMPLE 8
(1) Other Producing Conditions
 the same as Example 7
(2) Other Evaluation Conditions
 Fuel: hydrogen
 Operation temperature: 900° C.

EXAMPLE 9
(1) Other Producing Conditions
 the same as Example 7
(2) Other Evaluation Conditions
 Fuel: hydrogen+$H_2O$ (2(1)5%)
 Operation temperature: 1000° C.

COMPARATIVE EXAMPLE 1
(1) Other Producing Conditions
 Ni concentration in the cermet: 90 wt %
 YSZ concentration in the cermet: 10 wt %
 Amount of Ce dissolved in YSZ: 0 mol %
 Loading of SDC powder: 0 wt %
(2) Other Evaluation Conditions
 Fuel: hydrogen
 Operation temperature: 1000° C.

COMPARATIVE EXAMPLE 2
(1) Other Producing Conditions
 the same as Comparative Example 1
(2) Other Evaluation Conditions
 Fuel: hydrogen
 Operation temperature: 900° C.

COMPARATIVE EXAMPLE 3
(1) Other Producing Conditions
 the same as Comparative Example 1
(2) Other Evaluation Conditions
 Fuel: hydrogen+$H_2O$ (2(1)5%)
 Operation temperature: 1000° C.

COMPARATIVE EXAMPLE 4
(1) Other Producing Conditions
 Ni concentration in the cermet: 81 Wt %
 YSZ concentration in the cermet: 19 wt %
 Amount of Ce dissolved in YSZ: 0 mol %
 Loading of SDC powder: 0 wt %

(2) Other Evaluation Conditions
 Fuel: hydrogen
 Operation temperature: 1000° C.

COMPARATIVE EXAMPLE 5
(1) Other Producing Conditions
 the same as Comparative Example 1
(2) Other Evaluation Conditions
 Fuel: hydrogen
 Operation temperature: 900° C.

COMPARATIVE EXAMPLE 6
(1) Other Producing Conditions
 the same as Comparative Example 1
(2) Other Evaluation Conditions
 Fuel: hydrogen+$H_2O$ (2(1)5%)
 Operation temperature: 1000° C.

COMPARATIVE EXAMPLE 7
(1) Other Producing Conditions
 Ni concentration in the cermet: 60 wt %
 YSZ concentration in the cermet: 40 wt %
 Amount of Ce dissolved in YSZ: 0 mol %
 Loading of SDC powder: 0 wt %
(2) Other Evaluation Conditions
 Fuel: hydrogen
 Operation temperature: 1000° C.

COMPARATIVE EXAMPLE 8
(1) Other Producing Conditions
 the same as Comparative Example 7
(2) Other Evaluation Conditions
 Fuel: hydrogen
 Operation temperature: 900° C.

COMPARATIVE EXAMPLE 9
(1) Other Producing Conditions
 the same as Comparative Example 1
(2) Other Evaluation Conditions
 Fuel: hydrogen
 Operation temperature: 900° C.

FIG. 6 is a table showing production and evaluation conditions in the examples of the present invention and the conventional comparative examples.

Additionally, Examples 1 to 9 correspond to the fuel electrodes of the present invention, while Comparative Examples 1 to 9 indicate conventional examples.

Figure 7:
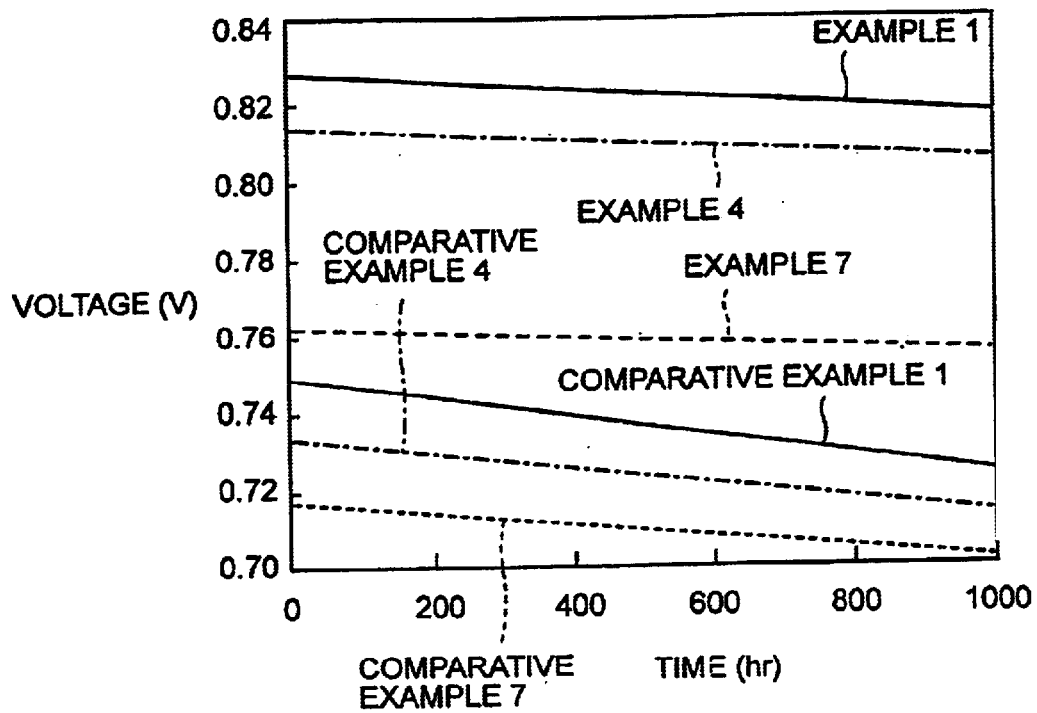
FIG. 7 is a graph showing a change in cell voltage with time when experiments are conducted on fuel electrodes by Examples 1, 4 and 7 of the present invention and Comparative Examples 1, 4 and 7.
Figure 8:
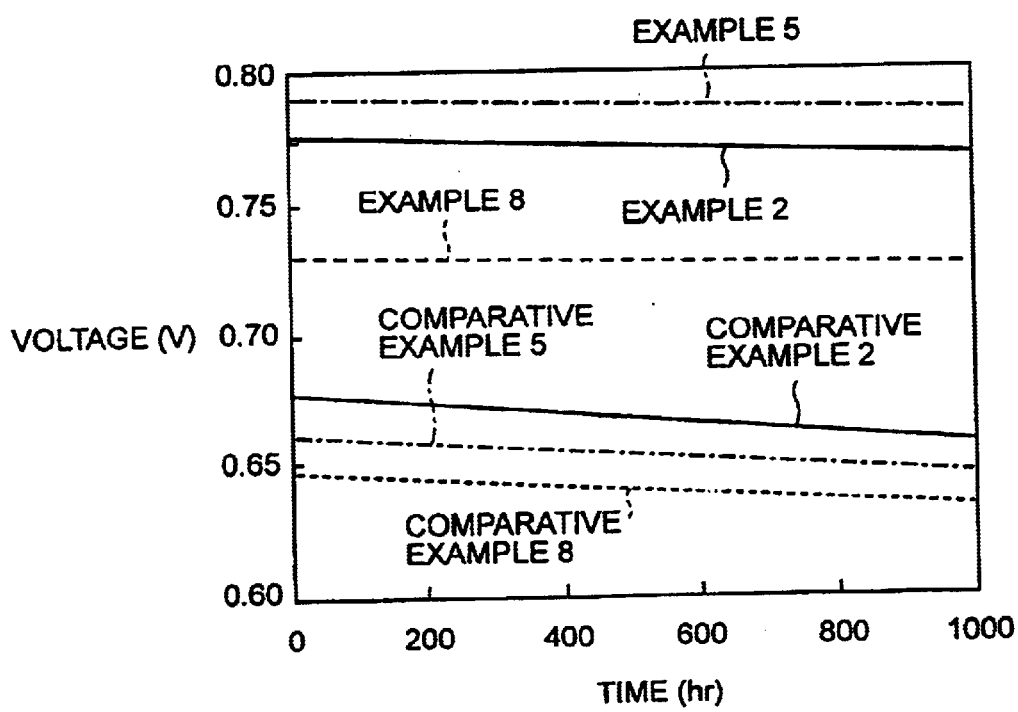
FIG. 8 is a graph showing a change in cell voltage with time when experiments are conducted on fuel electrodes by Examples 2, 5 and 8 of the present invention and Comparative Examples 2, 5 and 8.
Figure 9:
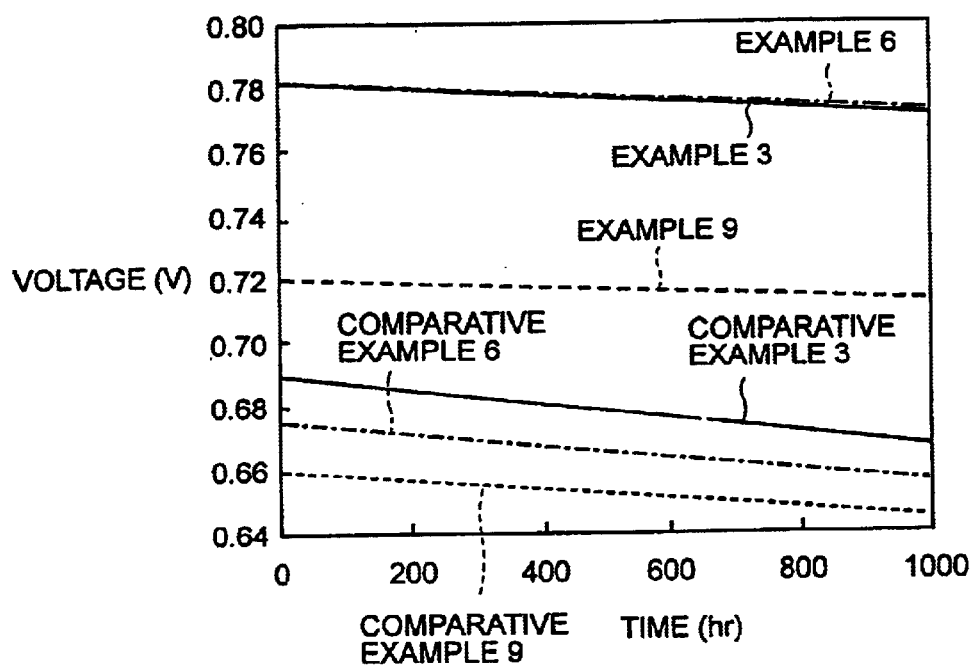
FIG. 9 is a graph showing a change in cell voltage with time when experiments are conducted on fuel electrodes by Examples 3, 6 and 9 of the present invention and Comparative Examples 3, 6 and 9.

FIGS. 7, 8 and 9 show changes in cell voltage with time when experiments are conducted on the fuel electrodes according to the above-mentioned examples of the present invention and the conventional comparative examples. In the drawings, an ordinate axis shows the cell voltage (v), and an abscissa axis shows an operation time.

FIG. 7 is a graph of the experiments on the fuel electrodes by Examples 1, 4 and 7 of the present invention and conventional Comparative Examples 1, 4 and 7.

FIG. 8 is a graph of the experiments on the fuel electrodes by Examples 2, 5 and 8 of the present invention and conventional Comparative Examples 2, 5 and 8.

FIG. 9 is a graph of the experiments on the fuel electrodes by Examples 3, 6 and 9 of the present invention and conventional Comparative Examples 3, 6 and 9.

The following is seen from FIG. 7. When hydrogen is used in the fuel, the examples of the present invention are superior to the conventional comparative examples in both initial performance and durability at 1000° C. This is because there are many electrode reaction fields, and the flocculation of Ni particles is prevented.

The following is seen from FIG. 8. Even when the temperature is lowered to 900° C., the examples of the present invention are superior to the conventional comparative examples in both initial performance and durability. Moreover, voltage drops from the lowering of the temperature are smaller than Comparative Examples 2, 5 and 8. This indicates that the fuel electrode of the present invention has a low temperature and many electrode reaction fields. Especially, it is seen that the performance of the electrode loaded with SDC powder is high at 900° C.

It is seen from FIG. 9 that even when a mixture gas of hydrogen and steam is used in the fuel, the examples of the present invention are superior to the conventional comparative examples in both initial performance and durability.

Figure 10:
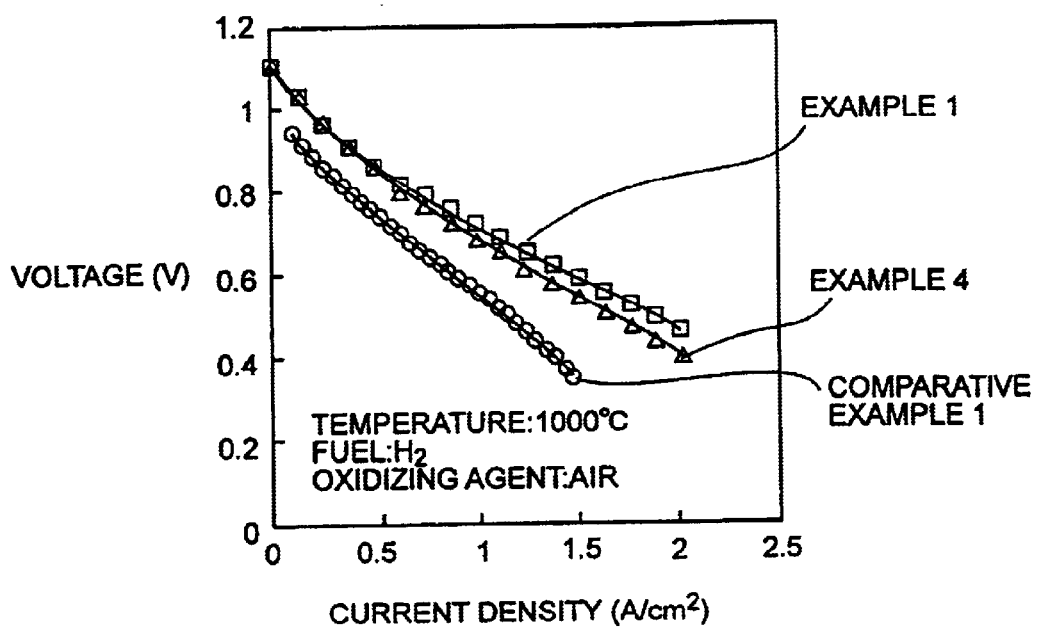
FIG. 10 is a comparative graph of current-voltage characteristics of cells at 1000° C. using fuel electrodes produced on the same conditions as Examples 1 and 4 of the present invention and Comparative Example 1.

FIG. 10 is a comparative graph of current-voltage characteristics of cells at 1000° C. using fuel electrodes produced in the same producing process as Examples 1 and 4 of the present invention and Comparative Example 1.

It is seen from FIG. 10 that the cell having the fuel electrode according to the present invention has a small voltage drop when currents are increased, and a small inner resistance.

Figure 11:
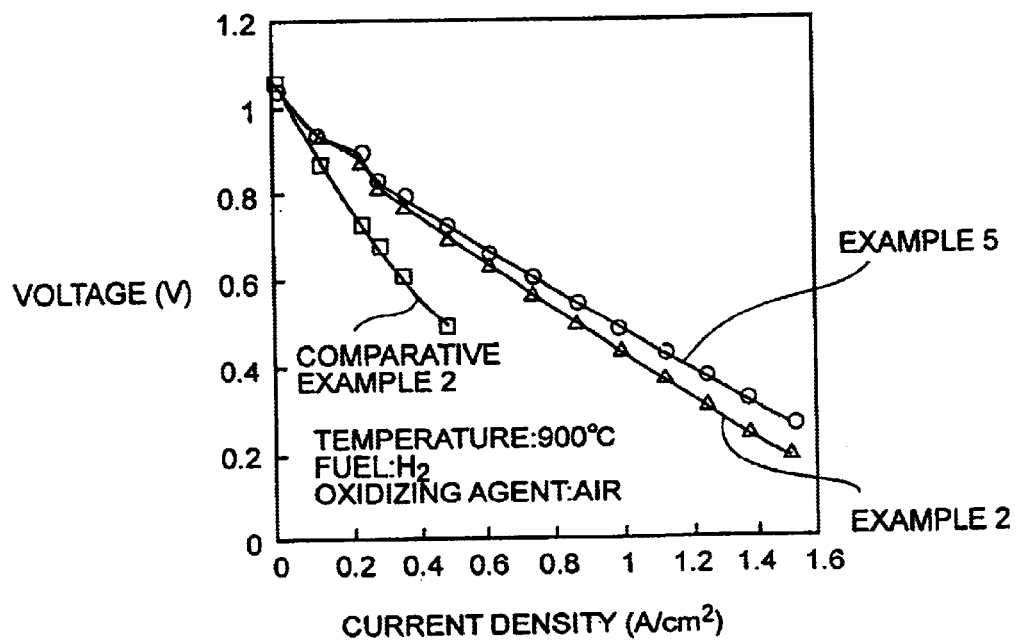
FIG. 11 is a comparative graph of current-voltage characteristics of cells at 900° C. using fuel electrodes produced on the same conditions as Examples 2 and 5 of the present invention and Comparative Example 2.

FIG. 11 is a comparative graph of current-voltage characteristics of cells at 900° C. using fuel electrodes produced in the same producing process as Examples 2 and 5 of the present invention and Comparative Example 2.

It is seen from FIG. 11 that the cell having the fuel electrode according to the present invention has a small inner resistance even at 900° C.

Additionally, in the above description, the present invention has been disclosed as the fuel electrode and the producing process thereof, but it can be applied to an oxygen sensor and a producing process thereof.

What is claimed is:

1. A process for producing a fuel electrode of a solid oxide fuel cell, each cell comprising a solid electrolyte layer, a fuel electrode disposed on one surface of the solid electrolyte layer, and an air electrode disposed on an opposite surface, by alternatively laminating a plurality of cells, adjacent cells being electrically connected to each other, and a plurality of separators for distributing fuel gas to the fuel electrode of each cell and oxidizing gas to the air electrode, comprising the steps of: adding a solution of a metallo-organic compound of yttrium (Y) and a solution of a metallo-organic transition-metal compound to a solution of a metallo-organic compound of zirconium (Zr) to prepare a mixed solution of metallo-organic compounds of Zr—Y-transition metal; mixing NiO powder and cerium oxide powder containing a divalent or trivalent metal oxide dissolved therein to the mixed solution of the metallo-organic compounds to prepare a slurry; and successively subject the slurry to hydrolysis, polycondensation, pyrolysis, annealing and reduction to obtain a cermet comprising yttria-stabilized zirconia (YSZ) containing a transition metal dissolved therein, nickel (Ni) and cerium oxide containing a divalent or trivalent metal dissolved therein.

2. The process for producing the fuel electrode of the solid oxide fuel cell according to claim 1 wherein said transition metal is cerium (Ce).

3. The process for producing the fuel electrode of the solid oxide fuel cell according to claim 1 wherein said transition metal is titanium (Ti) or praseodymium (Pr).

4. The process for producing the fuel electrode of the solid oxide fuel cell according to claim 1 wherein said metallo-organic compound is a metallic aliphatic acid salt.

5. The process for producing the fuel electrode of the solid oxide fuel cell according to claim 1 wherein said metalloorganic compound is a metallic acetyl acetonate complex.

6. The process for producing the fuel electrode of the solid oxide fuel cell according to claim 4 wherein said metallic aliphatic acid salt is a metallic octylate.

7. The process for producing the fuel electrode of the solid oxide fuel cell according to claim 1 wherein said fuel electrode is formed on a solid electrolyte by a screen printing process.

8. The process for producing the fuel electrode of the solid oxide fuel cell according to claim 1 wherein a volume fraction of the cerium oxide containing the divalent or trivalent metal dissolved therein in said cermet is in the range of 1% to 70%.

9. The process for producing the fuel electrode of the solid oxide fuel cell according to claim 1 wherein a concentration of Ni in said cermet is in the range of 20% to 95% as a volume fraction.

10. The process for producing the fuel electrode of the solid oxide fuel cell according to claim 1 wherein a concentration of the transition metal in YSZ containing said transition metal dissolved therein is in the range of 1 mol % to 30 mol %.

11. The process for producing the fuel electrode of the solid oxide fuel cell according to claim 1 wherein a concentration of YSZ containing the transition metal dissolved therein in said cermet is in the range of 1% to 50% as a volume fraction.

12. The process for producing the fuel electrode of the solid oxide fuel cell according to claim 1 wherein said divalent or trivalent metal oxide is one or a combination of plural ones selected from the group consisting of BeO, MgO, CaO, SrO, BaO, $Sm_2O_3$, $Y_2O_3$, $La_2O_3$, $Gd_2O_3$, $Sc_2O_3$, $Pr_2O_3$, $Nd_2O_3$, $Eu_2O_3$, $Yb_2O_3$, $DY_2O_3$, and $Ho_2O_3$.

13. The process for producing the fuel electrode of the solid oxide fuel cell according to claim 1 wherein said cermet has a structure in which surfaces of Ni particles and surfaces of cerium oxide particles containing the divalent or trivalent metal dissolved therein are covered with YSZ containing said transition metal dissolved therein in a form of thin films or fine particles.

14. The process for producing the fuel electrode of the solid oxide fuel cell according to claim 1 wherein said hydrolysis is performed, using moisture in air.

15. The process for producing the fuel electrode of the solid oxide fuel cell according to claim 1 wherein as materials of said cermet, cerium oxide powder containing the divalent or trivalent metal dissolved therein, Ni powder and a metallic octylate solution of Ce, Y and Zr are used, and YSZ fine particles containing the transition metal dissolved therein are uniformly dispersed between the cerium oxide particles containing the divalent or trivalent metal dissolved therein and the Ni particles.

16. The process for producing the fuel electrode of the solid fuel cell according to claim 15 wherein an average particle diameter of said Ni particles is 1 m or more, the average particle diameter of said cerium oxide particles containing the divalent or trivalent metal dissolved therein is 1 m or more, and the average particle diameter of said YSZ particles containing the transition metal dissolved therein is 1 m or less.

* * * * *